(12) United States Patent
Lee et al.

(10) Patent No.: US 9,658,131 B2
(45) Date of Patent: May 23, 2017

(54) TESTING APPARATUS FOR AUXILIARY BELT SYSTEM AND TESTING SYSTEM PROVIDED WITH THE SAME

(71) Applicants: HYUNDAI MOTOR COMPANY, Seoul (KR); KIA MOTORS CORPORATION, Seoul (KR)

(72) Inventors: Jong Won Lee, Hwaseong-si (KR); Key Chun Park, Yongin-si (KR); Eui Chul Choi, Seoul (KR); Yong Woo Kim, Seongnam-si (KR); Jae Ik Ahn, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/853,540

(22) Filed: Sep. 14, 2015

(65) Prior Publication Data

US 2016/0266007 A1    Sep. 15, 2016

(30) Foreign Application Priority Data

Mar. 9, 2015 (KR) .................. 10-2015-0032756

(51) Int. Cl.
*G01L 3/02* (2006.01)
*G01M 13/02* (2006.01)
*G01L 5/10* (2006.01)

(52) U.S. Cl.
CPC .......... *G01M 13/023* (2013.01); *G01L 5/107* (2013.01); *G01M 13/028* (2013.01)

(58) Field of Classification Search
CPC .... G01L 5/107; G01M 13/028; G01M 13/023
USPC .............................. 73/828, 862.194
See application file for complete search history.

(56) References Cited

U.S. PATENT DOCUMENTS

| 5,877,431 A | * | 3/1999 | Hirano | G01L 5/042 73/862.41 |
| 6,155,121 A | * | 12/2000 | Ishida | G01M 13/028 73/593 |
| 6,478,701 B1 | * | 11/2002 | Yasuhara | F16H 7/12 305/147 |
| 6,789,035 B1 | * | 9/2004 | Hashimoto | G01L 5/042 702/105 |

FOREIGN PATENT DOCUMENTS

| DE | 197 21 318 A1 | 3/1998 |
| EP | 0 922 951 A2 | 6/1999 |
| EP | 2 685 229 A1 | 1/2014 |
| FR | 2 970 330 A1 | 7/2012 |

(Continued)

*Primary Examiner* — Max Noori
(74) *Attorney, Agent, or Firm* — Brinks Gilson & Lione

(57) ABSTRACT

The present disclosure provides a testing apparatus of an auxiliary belt system. The testing apparatus of the auxiliary belt system includes: a tester bracket, a torque pulse simulation motor mounted to the tester bracket, a crankshaft pulley mounted to the tester bracket and rotated by operations of the torque pulse simulation motor, an auxiliary system mounted to the tester bracket, connected to the crankshaft pulley through a belt and rotated by rotation of the crankshaft pulley and a controller controlling operations of the torque pulse simulation motor.

12 Claims, 6 Drawing Sheets

(56) References Cited

FOREIGN PATENT DOCUMENTS

| | | |
|---|---:|---:|
| JP | 3328824 B2 | 9/2002 |
| JP | 2003-098041 A | 4/2003 |
| JP | 2007-131457 A | 5/2007 |
| JP | 2009-287986 A | 12/2009 |
| KR | 10-1999-0052873 A | 7/1999 |
| KR | 10-0412894 B1 | 12/2003 |
| KR | 10-0782156 B1 | 12/2007 |
| KR | 10-1268777 B | 5/2013 |
| KR | 10-2015-0002559 A | 1/2015 |

\* cited by examiner

TESTING APPARATUS FOR AUXILIARY BELT SYSTEM AND TESTING SYSTEM PROVIDED WITH THE SAME

CROSS-REFERENCE TO RELATED APPLICATION

This application claims the benefit of Korean Patent Application No. 10-2015-0032756, filed on Mar. 9, 2015, which is hereby incorporated in its entirety.

FIELD

The present disclosure relates to a testing apparatus of an auxiliary belt system and a testing system provided with the same.

BACKGROUND

The statements in this section merely provide background information related to the present disclosure and may not constitute prior art.

An air conditioner, an alternator, a motor/generator and and the like, which are driven by a crankshaft of an engine is called as an auxiliary machinery or an auxiliary belt system.

Recently, since consumers are interested in noise and vibration of a vehicle, vehicle manufacturers are concerned on reducing noise, vibration and so on of the auxiliary machinery or the auxiliary belt system.

In development stage of a vehicle, noise and vibration of an auxiliary belt and the like are diagnosed by an engine dyno (an engine dynamometer).

However, a manufacturing cost for a test engine is seriously high, and we have discovered that errors may be occurred due to noise and vibration of an engine itself, noise in a laboratory and so on. Also, real vehicle conditions, such as various temperature conditions, various moisture conditions may not be easily applied to the test engine.

The above information disclosed in this Background section is only for enhancement of understanding of the background of the present disclosure and therefore it may contain information that does not form the prior art that is already known in this country to a person of ordinary skill in the art.

SUMMARY

The present disclosure provides a testing apparatus of an auxiliary belt system and a testing system provided with the same which may test noise of an auxiliary belt, an auxiliary belt system and so on in early development stage of a vehicle.

Also, the present disclosure provides a testing apparatus of an auxiliary belt system and a testing system provided with the same which may be tested under various real vehicle conditions.

A testing apparatus of an auxiliary belt system according to an exemplary embodiment of the present disclosure may include a tester bracket, a torque pulse simulation motor mounted to the tester bracket, a crankshaft pulley mounted to the tester bracket and rotated by operations of the torque pulse simulation motor, an auxiliary system mounted to the tester bracket, connected to the crankshaft pulley through a belt and rotated by rotation of to the crankshaft pulley and a controller controlling operations of the torque pulse simulation motor.

The controller may control torque of the torque pulse simulation motor corresponding to each stroke of an engine.

The testing apparatus may further include a noise measuring apparatus measuring noise of the auxiliary system and the belt, wherein the controller may compare output signal of the noise measuring apparatus with a predetermined noise reference signal and output compared signal.

The auxiliary system may include a water pump, and the controller may adjust water pressure of the water pump for realizing real vehicle conditions.

The auxiliary system may include a starting motor, and the controller may adjust current load of the starting motor for realizing real vehicle conditions.

The auxiliary system may further include a battery simulator electrically connected the starting motor, and the controller may diagnose charging or discharging state of the battery simulator and outputs corresponding signal.

The auxiliary system may include an air conditioner, and the controller may adjust coolant pressure of the air conditioner for realizing real vehicle conditions.

The auxiliary system may include a hydraulic pressure pump, and the controller may adjust hydraulic pressure of the hydraulic pressure pump for realizing real vehicle conditions.

A mounting position and mounting angle of the auxiliary system mounted to the tester bracket may be adjustable.

The auxiliary system may further include a tensioner mounted to the tester bracket and driven by the belt and a tensioner displacement measure sensor sensing displacement of the tensioner, and the controller may compare output signal of the tensioner displacement measure sensor with a predetermined reference displacement and output corresponding signal.

A testing system according to an exemplary embodiment of the present disclosure may include an environmental box in which the auxiliary system is inserted, and the environmental box supplying reference environments including a predetermined temperature and a predetermined moisture to the auxiliary system.

The testing apparatus of an auxiliary belt system and a testing system provided with the same according to an exemplary embodiment of the present disclosure may test noise of an auxiliary belt, an auxiliary belt system and so on in early development stage of a vehicle.

Also, the testing apparatus of an auxiliary belt system and a testing system provided with the same according to an exemplary embodiment of the present disclosure may be tested under various real vehicle conditions so as to reduce diagnosis cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
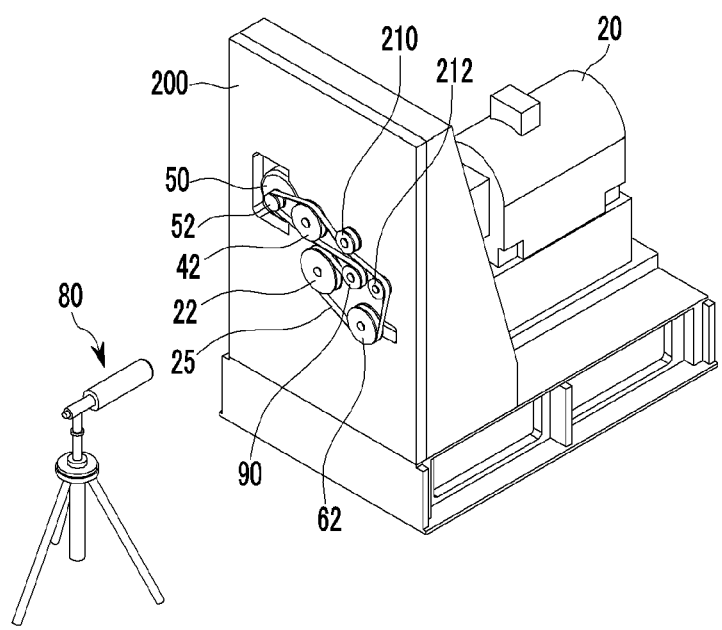
FIG. 1 is a perspective view of a testing apparatus of an auxiliary belt system according to an exemplary embodiment of the present disclosure.

The drawings described herein are for illustration purposes only and are not intended to limit the scope of the present disclosure in any way.

DESCRIPTION OF SYMBOLS

| | |
|---|---|
| 10: controller | 20: torque pulse simulation motor |
| 22: crankshaft pulley | 25: belt |
| 30: auxiliary system | 40: water pump |
| 42: water pump pulley | 50: starting motor |
| 52: starting motor pulley | 60: air conditioner |
| 62: air conditioner pulley | 70: hydraulic pressure pump |
| 80: noise measuring apparatus | 90: tensioner |
| 92: tensioner displacement measure sensor | |
| 100: battery simulator | |
| 110: map | 200: tester bracket |
| 210, 212: idler | 220: pulley bracket |
| 222: bolt | 224: gauge |
| 300: environmental box | |

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described embodiments may be modified in various different ways, all without departing from the spirit or scope of the present disclosure.

A part irrelevant to the description will be omitted to clearly describe the present disclosure, and the same or similar elements will be designated by the same reference numerals throughout the specification.

Throughout the specification and the claims, unless explicitly described to the contrary, the word "comprise" and variations such as "comprises" or "comprising", will be understood to imply the inclusion of stated elements but not the exclusion of any other elements.

Figure 2:
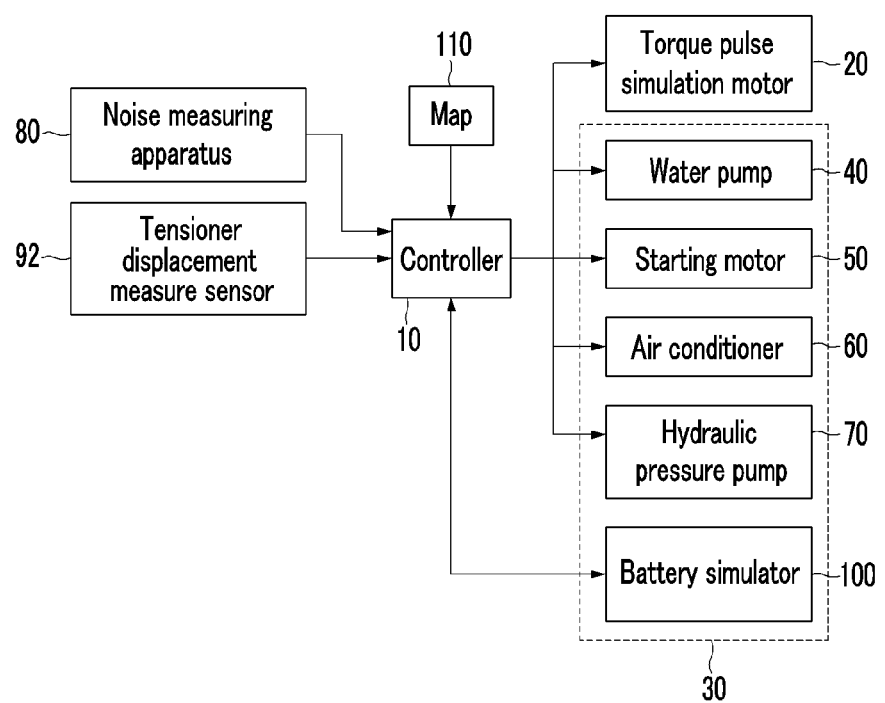
FIG. 2 is a block diagram of a testing apparatus of an auxiliary belt system according to an exemplary embodiment of the present disclosure.
Figure 3:
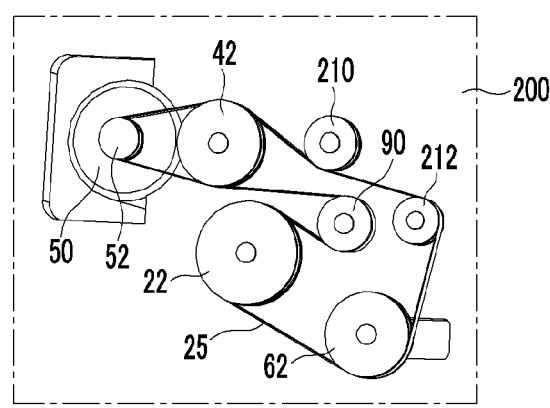
FIG. 3 is a partial front view of a testing apparatus of an auxiliary belt system according to an exemplary embodiment of the present disclosure.

Referring to FIG. 1 to FIG. 3, a testing apparatus of an auxiliary belt system according to an exemplary embodiment of the present disclosure includes a tester bracket 200, a torque pulse simulation motor 20 mounted to the tester bracket 200, a crankshaft pulley 22 mounted to the tester bracket 200 and rotated by operations of the torque pulse simulation motor 20, an auxiliary system 30 (FIG. 2) mounted to the tester bracket 200, connected to the crankshaft pulley 22 through a belt 25 and rotated by rotation of to the crankshaft pulley 22 and a controller 10 controlling operations of the torque pulse simulation motor 20.

In an exemplary embodiment of the present disclosure, the belt 25 is defined as elements which transmit power of an engine to the auxiliary system such as a belt, a chain and so on.

On the tester bracket 200, idlers 210 and 212 for adjusting tension of the belt 25 and a tensioner 90 for maintaining the tension of the belt 25 are mounted.

In an exemplary embodiment of the present disclosure, a real engine is replaced by the torque pulse simulation motor 20, and thus interference due to noise and vibration of a real engine may be excluded. Thus characteristics of noise and vibration of the auxiliary system 30 and the belt 25 may be diagnosed without distortion.

The controller 10 may control torque of the torque pulse simulation motor 20 corresponding to each stroke of an engine.

Torque of a general engine is changed according to each stroke. In an exemplary embodiment of the preset present disclosure, the controller 10 controls the torque of the torque pulse simulation motor 20 in order to demonstrate each stroke of the real engine so as to diagnose the characteristics of noise and vibration of the auxiliary system 30 itself.

The testing apparatus may further include a noise measuring apparatus 80 measuring noise of the auxiliary system 30 and the belt 25, and the controller 10 may compare output signal of the noise measuring apparatus 80 with a predetermined noise reference signal and output a compared signal.

The noise measuring apparatus 80 may be a microphone, and the predetermined noise reference signal is, for example, a vehicle noise signal including noise of a real engine and is stored in a map 110. The controller 10 compares the output signal of the noise measuring apparatus 80 with the predetermined noise reference signal, filters noise of the real engine and so on, and then outputs filtered noise signals as that of the auxiliary system 30 and the belt 25.

The auxiliary system 30 may include a water pump 40, and the controller 30 adjusts water pressure of the water pump 40 for realizing real vehicle conditions.

The water pump 40 is connected with a water pump pulley 42 and rotated by the crankshaft pulley 22 though the belt 25.

In a real vehicle operation state, load of a water pump is changed. Thus in an exemplary embodiment of the present disclosure, for the water pump 40 to be operated similar to a water pump installed in a real vehicle, operation control signals are stored in the map 110 and the controller 10 adjusts load of the water pump 40 according to the map 110. Thus, the testing apparatus of an auxiliary belt system according to the present disclosure may diagnose characteristics of noise/vibration of the auxiliary system 30 including the water pump 40 and the belt 25 similar to that of a real vehicle. The operation control signal for the water pump 40 may be determined through experiments.

The auxiliary system may include a starting motor 50, and the controller 10 may adjust current load of the starting motor 50 for realizing real vehicle conditions.

In an exemplary embodiment of the present disclosure, the starting motor 50 may be defined as motors including an alternator for electric generation, a motor to start a vehicle, a motor/generator and so on.

The starting motor 50 is connected with a starting motor pulley 52 and driven by the crankshaft pulley 22 through the belt 25.

In a real vehicle operation state, load of a starting motor varies. Thus in an exemplary embodiment of the present disclosure, for the starting motor 50 to be operated similar to a starting motor installed in a real vehicle, operation control signals are stored in the map 110 and the controller 10 adjusts load of the starting motor 50 according to the map 110. Thus, the testing apparatus of an auxiliary belt system according to the present disclosure may diagnose characteristics of noise/vibration of the auxiliary system 30 including the starting motor 50 and the belt 25 similar to that of a real vehicle. The operation control signal for the starting motor 50 may be determined through experiments.

The auxiliary system 30 further may include a battery simulator 100 electrically connected the starting motor 50, and the controller 10 diagnoses charging or discharging state of the battery simulator 100 and outputs corresponding signal.

In a real vehicle operation state, a battery is charged and discharged repeatedly. Thus in an exemplary embodiment of the present disclosure, the controller 10 detects the sates of the battery simulator 100 charged or discharged by the starting motor 50 and diagnoses the states of the battery simulator 100 similar to a battery of a real vehicle.

The auxiliary system 30 may include an air conditioner 60, and the controller 10 adjusts coolant pressure of the air conditioner 60 for realizing real vehicle conditions.

An air conditioner pulley 62 is mounted to the tester bracket 200 and is driven by the crankshaft pulley 22 through the belt 25. The air conditioner pulley 62 operates a compressor of the air conditioner 60.

In a real vehicle operation state, load of an air conditioner varies. Thus in an exemplary embodiment of the present disclosure, for the air conditioner 60 to be operated similar to an air conditioner installed in a real vehicle, operation control signals are stored in the map 110 and the controller 10 adjusts load of the air conditioner 60, that is coolant pressure, according to the map 110. Thus, the testing apparatus of an auxiliary belt system according to the present disclosure may diagnose characteristics of noise/vibration of the auxiliary system 30 including the air conditioner 60 and the belt 25 similar to that of a real vehicle. The operation control signal for the air conditioner 60 may be determined through experiments.

The auxiliary system may include a hydraulic pressure pump 70, and the controller 10 adjusts hydraulic pressure of the hydraulic pressure pump 70 for realizing real vehicle conditions.

The hydraulic pressure pump 70 may be driven by the crankshaft pulley 22 through the belt 25.

The hydraulic pressure pump 70 may generate hydraulic pressure, for example hydraulic pressure for driving a power steering device, hydraulic pressure for operating an engine, a transmission and so on.

In a real vehicle operation state, load of a hydraulic pressure pump varies. Thus in an exemplary embodiment of the present disclosure, for the hydraulic pressure pump 70 to be operated similar to a hydraulic pressure pump operated in a real vehicle, operation control signals are stored in the map 110 and the controller 10 adjusts load of the hydraulic pressure pump 70 according to the map 110. Thus, the testing apparatus of an auxiliary belt system according to the present disclosure may diagnose characteristics of noise/vibration of the auxiliary system 30 including the hydraulic pressure pump 70 and the belt 25 similar to that of a real vehicle. The operation control signal for the hydraulic pressure pump 70 may be determined through experiments.

Figure 4:
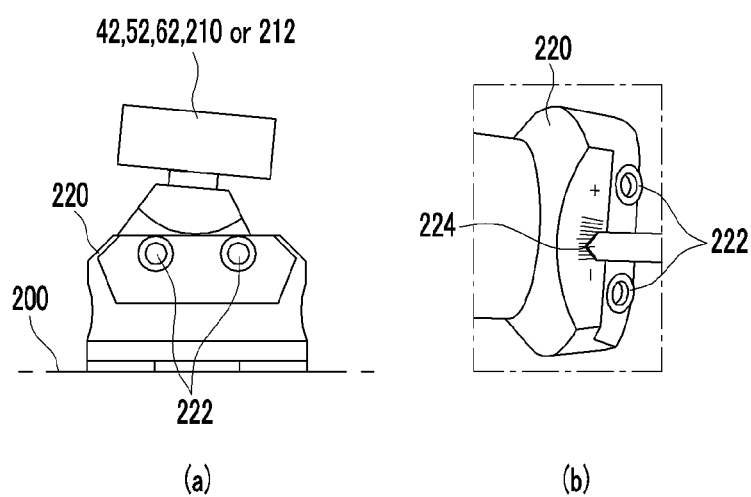
FIG. 4 is a drawing showing a mounting portion of an auxiliary system of a testing apparatus of an auxiliary belt system according to an exemplary embodiment of the present disclosure.

FIG. 4 is a drawing showing a mounting portion of an auxiliary system of a testing apparatus of an auxiliary belt system according to an exemplary embodiment of the present disclosure.

Referring to FIG. 4, a mounting position and a mounting angle of the auxiliary system 30 mounted to the tester bracket 200 is adjustable.

For example, the water pump pulley 42, the starting motor pulley 52, the air conditioner pulley 62, or the idlers 210 and 212 are mounted to a pulley bracket 220 fixed to the tester bracket 200 through adjust bolts 222.

The mounting positions and the mounting angles of the auxiliary system 30 are adjustable by adjusting engaging positions of the adjust bolts 222 at a predetermined angles considering tolerances of a real vehicle.

The tester bracket 200 is provided with a gauge 224 and various mounting positions and various mounting angles of the auxiliary system 30 may be tested considering predetermined tolerances.

Figure 5:
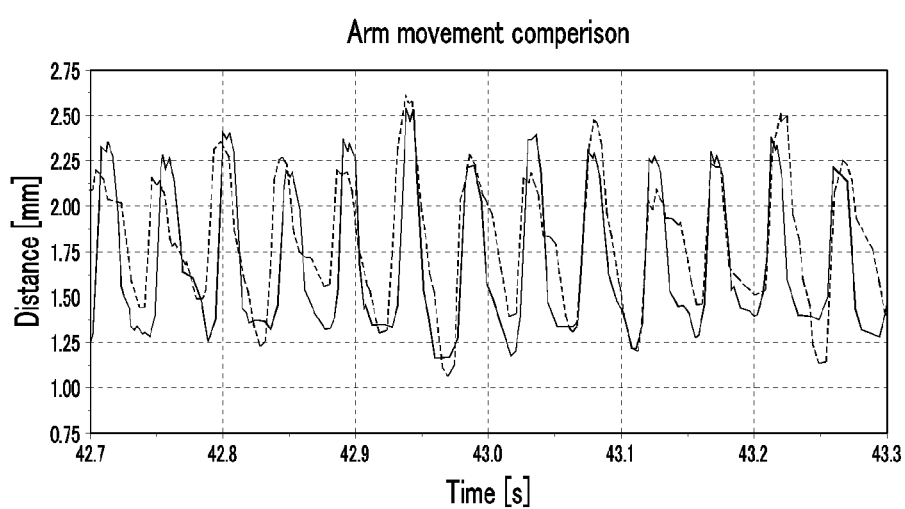
FIG. 5 is a graph of displacement of a tensioner of an auxiliary belt system according to an exemplary embodiment of the present disclosure.

FIG. 5 is a graph of displacement of a tensioner of an auxiliary belt system according to an exemplary embodiment of the present disclosure.

Referring FIG. 1 to FIG. 3 and to FIG. 5, the auxiliary system may further include a tensioner 90 mounted to the tester bracket 200 and driven by the belt 25 and a tensioner displacement measure sensor 92 sensing displacement of the tensioner 90, and the controller 10 may compare output signal of the tensioner displacement measure sensor 92 with a predetermined reference displacement and output corresponding signal.

In FIG. 5, a solid line denotes displacement of a tensioner driven by a real engine, and dotted line denotes displacement the tensioner 90 driven by the torque pulse simulation motor 20 according to an exemplary embodiment of the present disclosure.

The controller 10 compares the displacement of the tensioner 90 with the displacement of the tensioner driven by the real engine and determines whether the torque pulse simulation motor 20 realize operation states of the real engine or not.

Figure 6:
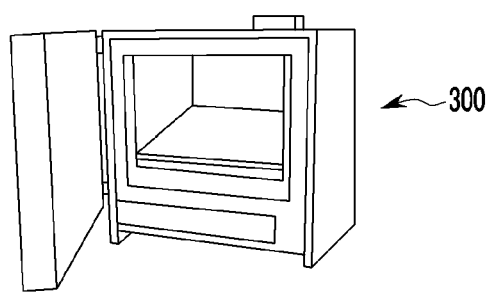
FIG. 6 is a perspective view of an environmental box of a testing system according to an exemplary embodiment of the present disclosure.

FIG. 6 is a perspective view of an environmental box of a testing system according to an exemplary embodiment of the present disclosure.

Referring to FIG. 6, a testing system according to an exemplary embodiment of the present disclosure further includes an environmental box 300 of which the auxiliary system 30 is inserted therein, and the environmental box 300 supplying reference environments including a predetermined temperature and predetermined moisture to the auxiliary system 30.

The environmental box 300 may realize temperature and moisture which a real vehicle may encounter. And the auxiliary system 30 is inserted into the environmental box 300 and then operation states of the auxiliary system 30 may be diagnosed.

Thus, various environmental conditions may be applied to the auxiliary system 30 and diagnosed without changing temperature and moisture of a laboratory.

As described above, the testing apparatus of an auxiliary belt system and a testing system provided with the same according to an exemplary embodiment of the present disclosure may test noise of an auxiliary belt, an auxiliary belt system and so on in early development stage of a vehicle excluding noise of an engine, a transmission and so on.

Also, the testing apparatus of an auxiliary belt system and a testing system provided with the same according to an exemplary embodiment of the present disclosure may be tested under various real vehicle conditions so as to reduce diagnosis cost.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the appended claims.

What is claimed is:

1. A testing apparatus for an auxiliary belt system comprising:
   a tester bracket;
   a torque pulse simulation motor mounted to the tester bracket;
   a crankshaft pulley mounted to the tester bracket and rotated by operations of the torque pulse simulation motor;
   an auxiliary system mounted to the tester bracket, connected to the crankshaft pulley through a belt and rotated by rotation of the crankshaft pulley; and
   a controller configured to control a torque of the torque pulse simulation motor so as to demonstrate each stroke of an engine.

2. The testing apparatus according to claim 1, wherein the demonstrated strokes correspond to the strokes of an actual engine of a vehicle.

3. The testing apparatus according to claim 1, wherein the testing apparatus further comprises a noise measuring apparatus configured to measure a noise of the auxiliary system and the belt, and
   wherein the controller compares an output signal of the noise measuring apparatus with a predetermined noise reference signal and outputs a compared signal.

4. The testing apparatus according to claim 3, wherein the auxiliary system comprises a water pump, and
   wherein the controller adjusts a water pressure of the water pump for realizing real vehicle conditions.

5. The testing apparatus according to claim 3, wherein the auxiliary system comprises a starting motor, and
   wherein the controller adjusts a current load of the starting motor for realizing real vehicle conditions.

6. The testing apparatus according to claim 5, wherein the auxiliary system further comprises a battery simulator electrically connected to the starting motor, and
   wherein the controller diagnoses charging or discharging state of the battery simulator and outputs a corresponding signal.

7. The testing apparatus according to claim 3, wherein the auxiliary system comprises an air conditioner, and
   wherein the controller adjusts a coolant pressure of the air conditioner for realizing real vehicle conditions.

8. The testing apparatus according to claim 3, wherein the auxiliary system comprises a hydraulic pressure pump, and
   wherein the controller adjusts a hydraulic pressure of the hydraulic pressure pump for realizing real vehicle conditions.

9. The testing apparatus according to claim 3, wherein a mounting position and a mounting angle of the auxiliary system mounted to the tester bracket is adjustable.

10. The testing apparatus according to claim 3, wherein the auxiliary system further comprises:
    a tensioner mounted to the tester bracket and driven by the belt; and
    a tensioner displacement measure sensor sensing a displacement of the tensioner,
    wherein the controller compares an output signal of the tensioner displacement measure sensor with a predetermined reference displacement and outputs a corresponding signal.

11. The testing apparatus according to claim 10, wherein the output signal of the tensioner displacement measure sensor corresponds to a displacement of the tensioner driven by the torque pulse simulation motor, and the predetermined reference displacement corresponds to a displacement of the tensioner driven by a real engine, the controller configure to determine whether the torque pulse simulation motor realizes operation status of a real engine based on the corresponding signal.

12. A testing system comprising:
    an environmental box in which the auxiliary system according to claim 1 is inserted, and the environmental box configured to supply reference environments including a predetermined temperature and a predetermined moisture to the auxiliary system.

* * * * *